No. 655,638.	Patented Aug. 7, 1900.
J. G. ROBINSON.
FENCE POST.
(Application filed Aug. 18, 1899.)
(No Model.)
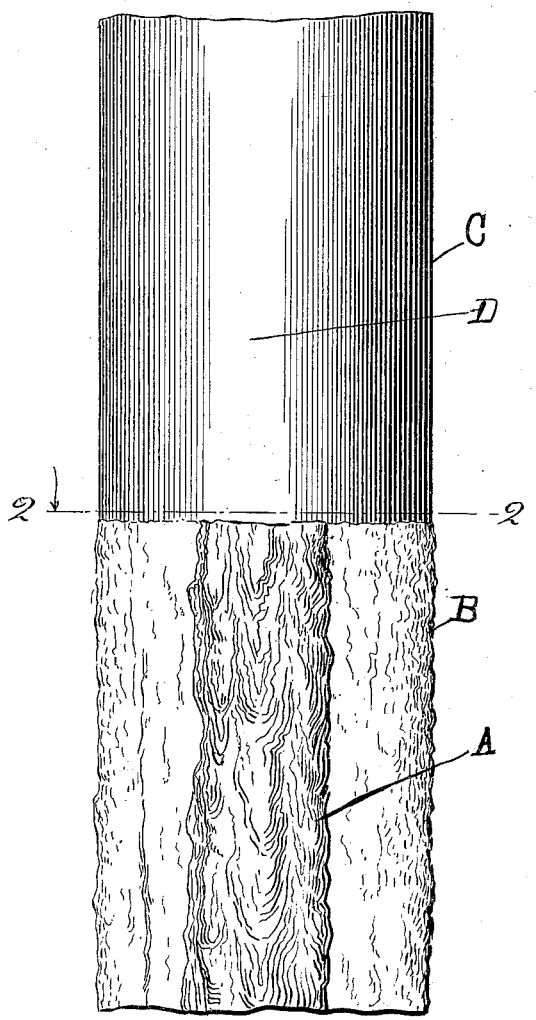
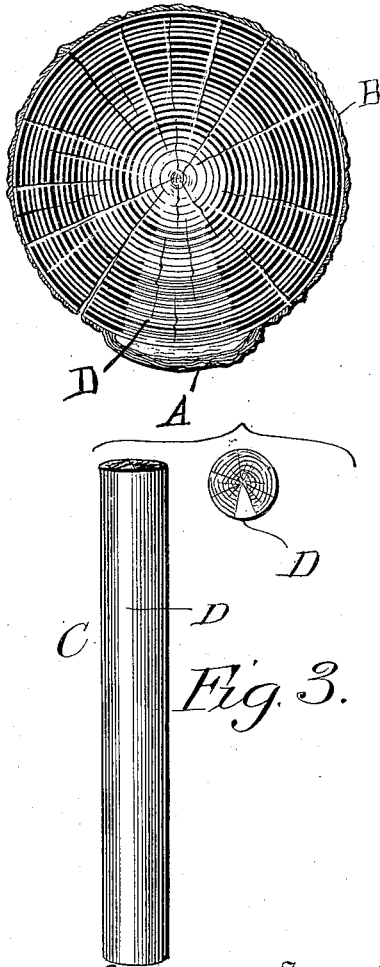

UNITED STATES PATENT OFFICE.

JULIUS GURDON ROBINSON, OF BROOKLYN, ALABAMA.

FENCE-POST.

SPECIFICATION forming part of Letters Patent No. 655,638, dated August 7, 1900.

Application filed August 18, 1899. Serial No. 727,672. (No model.)

*To all whom it may concern:*

Be it known that I, JULIUS GURDON ROBINSON, a citizen of the United States, residing at Brooklyn, in the county of Conecuh and State of Alabama, have invented certain new and useful Improvements in Fence-Posts; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in fence-posts and in the method employed in treating the growing timber, whereby a substantial and durable post is produced, which without artificial treatment of any kind after the cutting of the post from the tree will in a great measure be exempt from decay, as well as from the ravages of insects, and which, in consequence, when placed in the ground will last for many years.

The invention relates, further, to the provision of a fence-post the body portion of which is hard and impervious to moisture and yet provided upon one of its sides with a longitudinal strip of wood which has not been affected by the treatment to which the growing tree is subjected and to which strip the fence may be readily nailed or otherwise secured.

The invention is clearly illustrated in the accompanying drawings, which, with the letters of reference marked thereon, form a part of this specification, and in which—

Figure 1 represents in side elevation a portion of the trunk of a pine-tree, showing my method of treatment. Fig. 2 is a transverse section taken upon the line 2 2 of Fig. 1. Fig. 3 is an elevation and section of a piece of timber embodying my invention in the form of a fence-post.

In carrying my invention into practice I first select growing pine-trees of suitable size for producing posts of the desired diameter. Without cutting or felling the tree I remove the bark from the tree from the ground upward, leaving only a narrow strip of bark A, which extends vertically upon one side of the tree. This narrow strip of bark serves to permit the sap to pass from the roots to the branches of the tree, and thus preserves the life of the tree. The tree thus operated upon is allowed to stand for a sufficient period of time to permit the tree to undergo the change required to produce the desired result. I have found that when a pine-tree is treated in the manner described nature in order to cure the wound that has been occasioned to the tree by the removal of the major portion of its bark will throw out a vast amount of pitch, which will thoroughly permeate the body portion of the tree upon all sides, excepting the narrow strip D, which is covered by the strip of bark A, and a rough coating of hard pitch will be deposited upon the outer surface of the tree, as indicated at B. This effect is more clearly shown upon reference being had to a cross-section of the tree, as shown in Fig. 2 of the drawings. The upper portion of the tree-trunk (shown in Fig. 1 of the drawings) is shown as having the entire bark removed and also having the rough outer coating of pitch removed, and it will be noted that the line of demarcation between that portion of the tree-trunk that was formerly covered by the narrow strip of bark A and the remaining portion of the trunk is very clearly defined. The tree having been left for the period necessary to permit the thorough permeation of the pitch, the tree is cut and the posts are prepared therefrom. I have found that posts thus prepared by reason of the fact that the wood is so thoroughly permeated with pitch as to preclude the possibility of its being affected by moisture or the action of insects will last for a very great length of time when placed in the ground either as posts or for other use.

As this invention relates specifically to the treatment of growing timber for use in making fence-posts, the importance of cutting the tree before the strip A of bark is removed from the tree will be at once apparent, as it is necessary that provision should be had whereby the horizontal rails of the fence can be nailed or otherwise secured to the post. If this strip of bark was removed from the tree a considerable time before the cutting of the tree, it is at once evident that the wood structure upon the side of the tree that was protected by the strip A would become permeated with pitch, thus rendering the entire body of the post so hard as to resist the penetration by nails or other means employed for securing the fence-rails to the post. By permitting the strip A to remain until the tree is cut I provide upon one side of the post a longitudinal strip of natural wood, which serves as a means for retaining the nails in constructing the fence, as will be readily understood.

Having thus described my invention, what I claim to be new, and desire to secure by Letters Patent, is—

As an improved article of manufacture, a fence-post having its major portion saturated with pitch and a longitudinal, segmental portion unaffected by the pitch and therefore soft to receive the nails or other securing means, substantially as specified.

In testimony whereof I affix my signature in presence of two witnesses.

JULIUS GURDON ROBINSON.

Witnesses:
B. F. MASON,
S. H. DEAN.